United States Patent [19]
Cragun et al.

[11] Patent Number: 6,161,112
[45] Date of Patent: Dec. 12, 2000

[54] WEB PAGE PRESENTATION CONTROL MECHANISM AND METHOD

[75] Inventors: Brian John Cragun; Paul R. Day, both of Rochester, Minn.

[73] Assignee: International Business Machines Corporation, Armonk, N.Y.

[21] Appl. No.: 09/081,449

[22] Filed: May 19, 1998

[51] Int. Cl.$^7$ .............................. G06F 17/00; G06F 17/60; G06F 3/00

[52] U.S. Cl. .......................... 707/501; 707/513; 707/515; 705/14

[58] Field of Search .................................. 707/501, 513, 707/514, 515, 526; 705/14

[56] References Cited

U.S. PATENT DOCUMENTS 5,572,643  11/1996  Judson ..................................... 709/218

OTHER PUBLICATIONS

Tyler, Denise. "Laura Lemay's Web Workshop: Microsoft® FrontPage™ 97, 2nd Edition." Sams.net Publishing, Indianapolis, IN. ©1997. Released Jan. 1997. pp. xxxvii, 26, 221–252, and 700.

"GIF89a–based Animation for the WWW." ©1996, 1997 Royal E. Frazier, Jr. Found online at http://member.aol.com/royalef/gifanim.htm.

"OmniFleet® Fleet Maintenance Software—Electronic Delivery Info." Found online at http://www.omnifleet.com/order$_{13}$ info/osdinfo.html.

Lie, Hakon Wium, and Bert Bos. "Cascading Style Sheets, level 1." W3C Recommendation Dec. 17, 1996. Available online at http://www.w3.org/TR/REC–CSS1–961217.

"Animated Gif Files." Page maintained by Dr. Robert Fry. Last updated Nov. 11, 1997. Found online at http://www.assumption.edu/HTML/Academic/docs/CS80/angif.html.

"Graphics Interchange Format, Version 89a." ©1987, 1988, 1989, 1990 CompuServe Inc., Columbus, OH. Found online at http://www.geocities.com/SiliconValley/Lakes/2160/fformats/gif89a.txt.

*Primary Examiner*—Joseph H. Feild
*Assistant Examiner*—Michael J. Perkins
*Attorney, Agent, or Firm*—Martin & Associates, L.L.C; Derek P. Martin

[57] ABSTRACT

A presentation control mechanism allows a user to set presentation attributes for one or more presentation items on a web page. These presentation attributes determine how a presentation item is presented to the user. A user may set global presentation attributes that may serve as the default presentation attributes for each individual presentation item. A user can also setup or change the individual presentation attributes for each presentation item on the web page. In this manner, a user can alter the presentation of items on a web page to suit the user's individual taste.

23 Claims, 11 Drawing Sheets

Presentation Preferences

☒ Allow Size Change
☒ Allow Motion
☐ Show Detail

Active Time [ ] minutes
Visible Time [ ] minutes
Sleep Time [ ] minutes ( OK )   ( CANCEL )

FIG. 11

Promotional Feedback

How do you like this promotional item?
○ Love
● Like
○ Neutral
○ Tolerate
○ Hate ● Male    ○ Female Age [ 26 ]

Comments

Cute dancing banana!

( SUBMIT )   ( CANCEL )

FIG. 12

Presentation Item 128

| |
|---|
| Size Change Enabled — 1610 |
| Last Size Change — 1612 |
| Motion Enabled — 1614 |
| Motion Speed — 1616 |
| Active Time — 1618 |
| Minimum Active Time — 1620 |
| Visible Time — 1622 |
| Minimum Visible Time — 1624 |
| Sleep Time — 1626 |
| Minimum Sleep Time — 1628 |
| Maximum Sleep Time — 1630 |
| Enable Detail — 1632 |
| Mode Shift Time — 1634 |
| Current Mode — 1636 |
| Visible Constant — 1638 |
| Sleep Cycle — 1640 |
| Absolute Maximum Sleep Time — 1642 |
| Sliding Sleep Scale Factor — 1644 |
| Sliding Maximum Sleep Factor — 1646 |

FIG. 16

WEB PAGE PRESENTATION CONTROL MECHANISM AND METHOD

BACKGROUND OF THE INVENTION

1. Technical Field

This invention generally relates to computer networks, such as the Internet. More specifically, this invention relates to a mechanism and method for allowing a user to alter the appearance of portions of a web page.

2. Background Art

The development of the EDVAC computer system of 1948 is often cited as the beginning of the computer era. Since that time, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other. In this manner, a large number of people within a company could communicate with other computers on the network.

One significant computer network that has recently become very popular is the Internet. The Internet grew out of this proliferation of computers and networks, and has evolved into a sophisticated worldwide network of computer system resources commonly known as the "world-wide-web", or WWW. A user at an individual PC (i.e., workstation) that wishes to access the Internet typically does so using a software application known as a web browser. A web browser makes a connection via the Internet to other computers known as web servers, and receives information from the web servers that is displayed on the user's workstation. Information transmitted from the web server to the web browser is generally formatted using a specialized language called Hypertext Markup Language (HTML) and is typically organized into pages known as web pages. Many web pages include several individual components, such as text, banners, graphical images, Java applets, audio links, video links, and other components that present the web page to the user in a desired way. A designer of a web page can select a unique combination of components to provide the user with a desired overall presentation of the web page.

The Internet has become a very popular medium for promoting the goods and services of a wide array of companies. Advertisements and other promotional items are often placed on web pages in an attempt to influence the user to buy certain products or to request information regarding products and services. These promotional items are typically web page components. Some of these promotional components may be static, such as a text block or banner. Others may provide different degrees of motion or animation in an attempt to catch the user's eye. However, too much motion or animation may prove to annoy rather than attract the user.

Known web browsers allow a user only a small amount of control over the presentation of a web page. For example, Microsoft Internet Explorer version 3.0 gives a user setup options that allow the user to turn off the downloading of picture, sound, or video components to speed up the speed of loading a web page. However, the user control is limited to enabling or disabling each of these types of components. If the user decided to load these portions of a web page, they will be presented in only one way.

As the number of Internet users, providers, and web servers continues to rapidly expand, it will become increasingly important for a web user to be able to have more control over the presentation of a web page. Without improvements that give the user more control over information presented on a web page, the computer industry will continue to suffer from current methods of displaying web pages that are an impediment to achieving a presentation of a web page that is most desirable for the user.

DISCLOSURE OF INVENTION

According to the present invention, a presentation control mechanism allows a user to set presentation attributes for one or more presentation items on a web page. These presentation attributes determine how a presentation item is presented to the user. A user may set global presentation attributes that may serve as the default presentation attributes for each individual presentation item. A user can also setup or change the individual presentation attributes for each presentation item on the web page. In this manner, a user can alter the presentation of items on a web page to suit the user's individual taste.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and:

FIG. 11 is a sample menu window that allows a user to define presentation preferences in accordance with the preferred embodiments;

FIG. 12 is a sample feedback window that allows a user to provide feedback regarding the appearance of a presentation item on the web page;

FIG. 16 is a schematic diagram of data that may be associated with each presentation item.

BEST MODE FOR CARRYING OUT THE INVENTION

The method and apparatus of the present invention has particular applicability to the presentation of web pages on the Internet. For those individuals who are not familiar with the Internet, a brief overview of relevant Internet concepts is presented here.

1. OVERVIEW

Internet Communications

Figure 2:
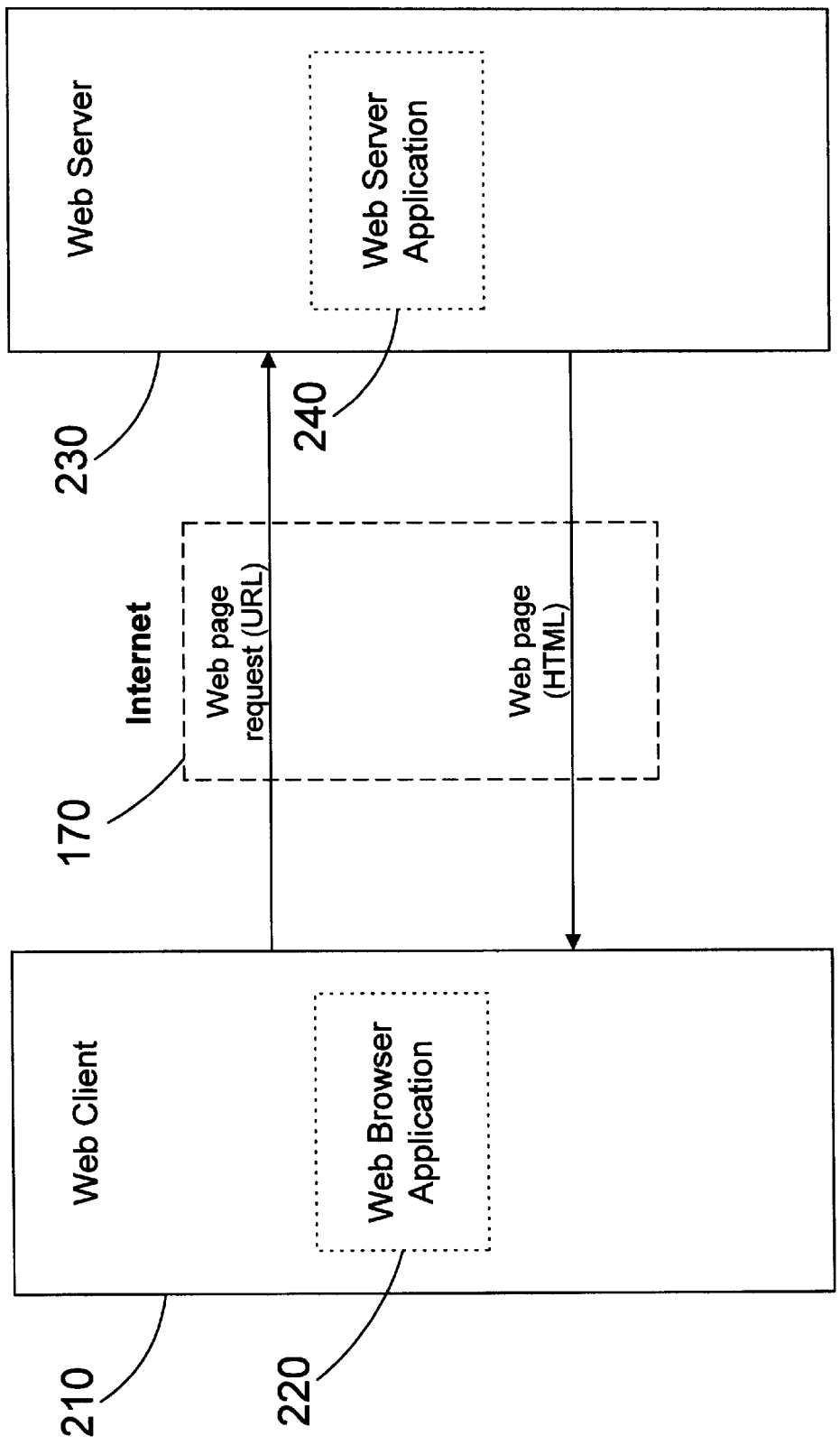
FIG. 2 is a block diagram of a typical Internet connection.

An example of a typical Internet connection is shown in FIG. 2. A user that wishes to access information on the Internet 170 typically has a computer workstation 210 known as a web client that executes an application program known as a web browser 220. Under the control of web browser 220, workstation 210 sends a request for a web page over the Internet 170. Web page data can be in the form of text graphics and other forms of information, collectively known as MIME data. Each web server on the Internet has a known address, termed the Uniform Resource Locator (URL), which the web browser uses to connect to the appropriate web server. Because web server 230 can contain more than one web page, the user will also specify in the address which particular web page he wants to view on web server 230. A web server computer system 230 executes a web server application 240, monitors requests, and services requests for which it has responsibility. When a request specifies web server 230, web server application 240 generally accesses a web page corresponding to the specific request, and transmits the page to the user's workstation 210.

Web Pages

Figure 3:
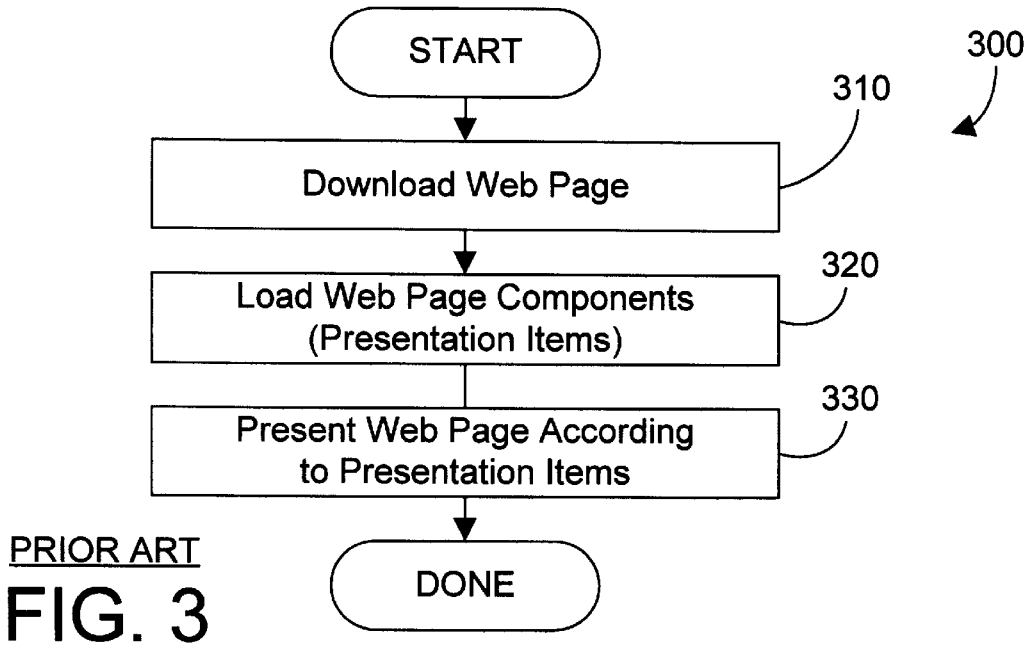
FIG. 3 is a flow diagram of a prior art method for viewing web pages.

A web page may contain various types of MIME data. Most web pages include visual data that is intended to be displayed on the monitor of user workstation 210. Web pages are generally written in Hypertext Markup Language (HTML). When web server 230 receives a web page request, a prior art method 300 as shown in FIG. 3 is typically used to display the requested web page to a user. Method 300 begins by downloading the web page in HTML form across the Internet 170 to the requesting web browser 220 (step 310). As discussed above, each web page typically includes a collection of separate "components". The HTML code of the downloaded web page typically contains references to components that must be separately loaded. These components are then loaded (step 320), and the web browser 220 outputs the web page and its components to user workstation 210 (step 330). Note that in addition to MIME data, a web page may also contain links that reference addresses of other web pages. The user can invoke these other web pages by clicking on these links using a mouse or other pointing device. This entire system of web pages with links to other web pages on other servers across the world is known as the "World Wide Web".

2. DETAILED DESCRIPTION

The present invention improves the user's experience of browsing web pages by giving the user some control over how information in the web page is presented. While the preferred embodiments described herein discuss web pages on the Internet, the present invention expressly encompasses any and all means and methods for presenting data to a user. Thus, browsing pages on an intranet is likewise within the scope of the invention, as is the presentation of any set of data on a computer system.

Figure 1:
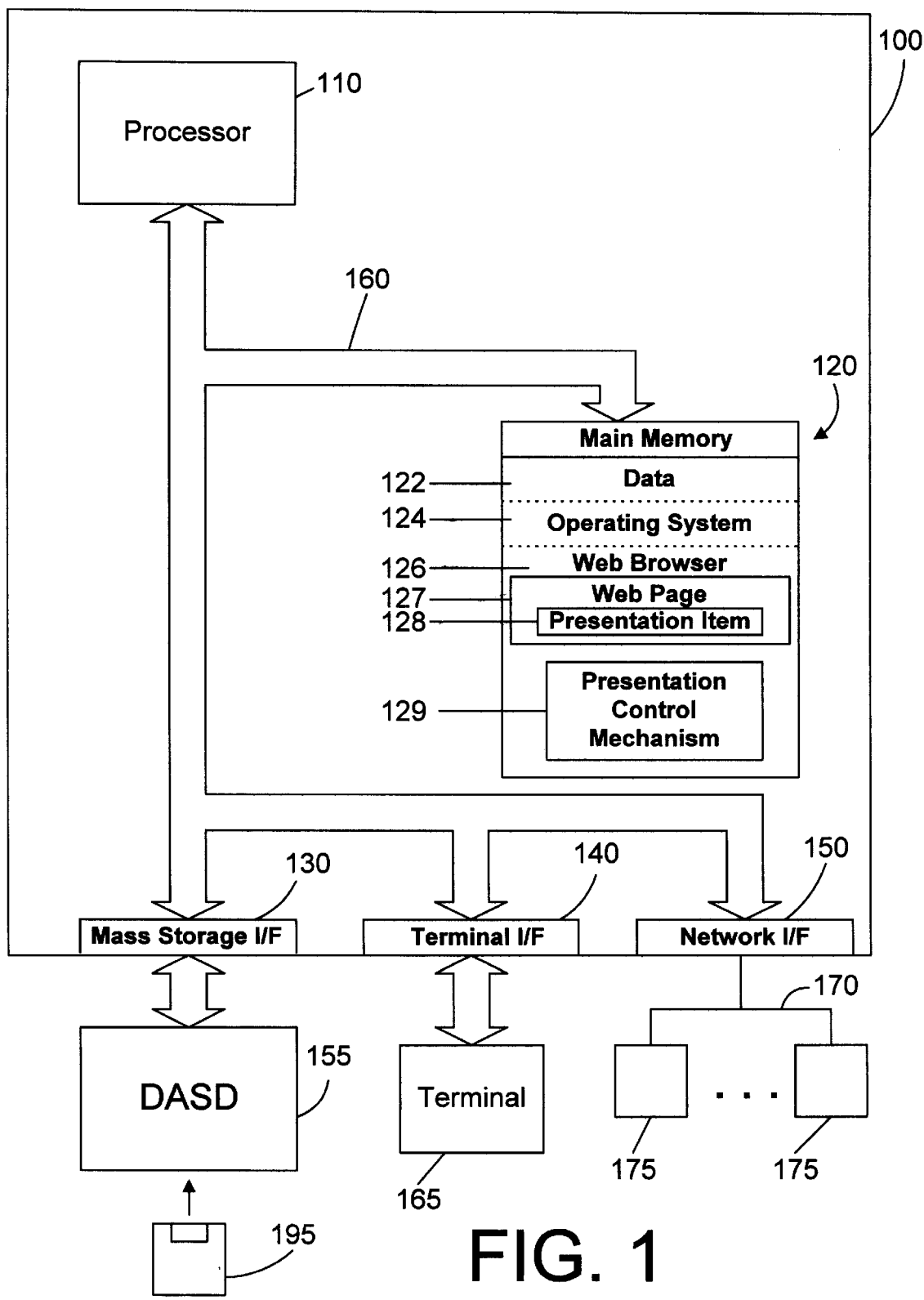
FIG. 1 is a block diagram of a computer system that allows the user to determine the presentation of a web page in accordance with the preferred embodiments.

Referring to FIG. 1, a computer system 100 in accordance with the preferred embodiment is an enhanced IBM 350 personal computer. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 includes data 122, operating system 124, and a web browser 126 that is used to view one or more web pages 127. Each web page 127 typically includes one or more presentation items 128. Presentation item 128 is any portion of a web page that is presented to a user, whether by picture, audio, video, text, or other means. Components in a web page, such as graphical interface files (.GIF) and sound files (.WAV), are examples of presentation item 128. However, presentation item 128 expressly extends to any portion of a web page that can be presented to the user, whether now known or developed in the future.

Web browser 126 suitably includes a presentation control mechanism 129 that determines how the presentation items 128 in web page 127 are presented to the user. In the best mode of the invention, presentation control mechanism 129 is a part of web browser 126; however, it is within the scope of the present invention for presentation control mechanism 129 to be a separate computer program, or to be a part of other computer programs in a computer system. For example, presentation control mechanism 129 may be a computer program separate from all others, may be a part of operating system 124, or may be a plug-in for web browser 126.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, browser 126, web pages 127, and presentation control mechanism 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160. Operating system 124 is a multitasking operating system known in the industry as OS/2; however, those skilled in the art will appreciate that the spirit and scope of the present invention is not limited to any one operating system.

Although computer system 100 is shown to contain only a single processor and a single system bus, those skilled in the art will appreciate that the present invention may be practiced using a computer system that has multiple processors and/or multiple buses. In addition, the interfaces may each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be monitors, non-intelligent (i.e., dumb) terminals, or fully programmable workstations, are used to allow system administrators and users to communicate with computer system 100.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions of presentation control mechanism 129 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 4:
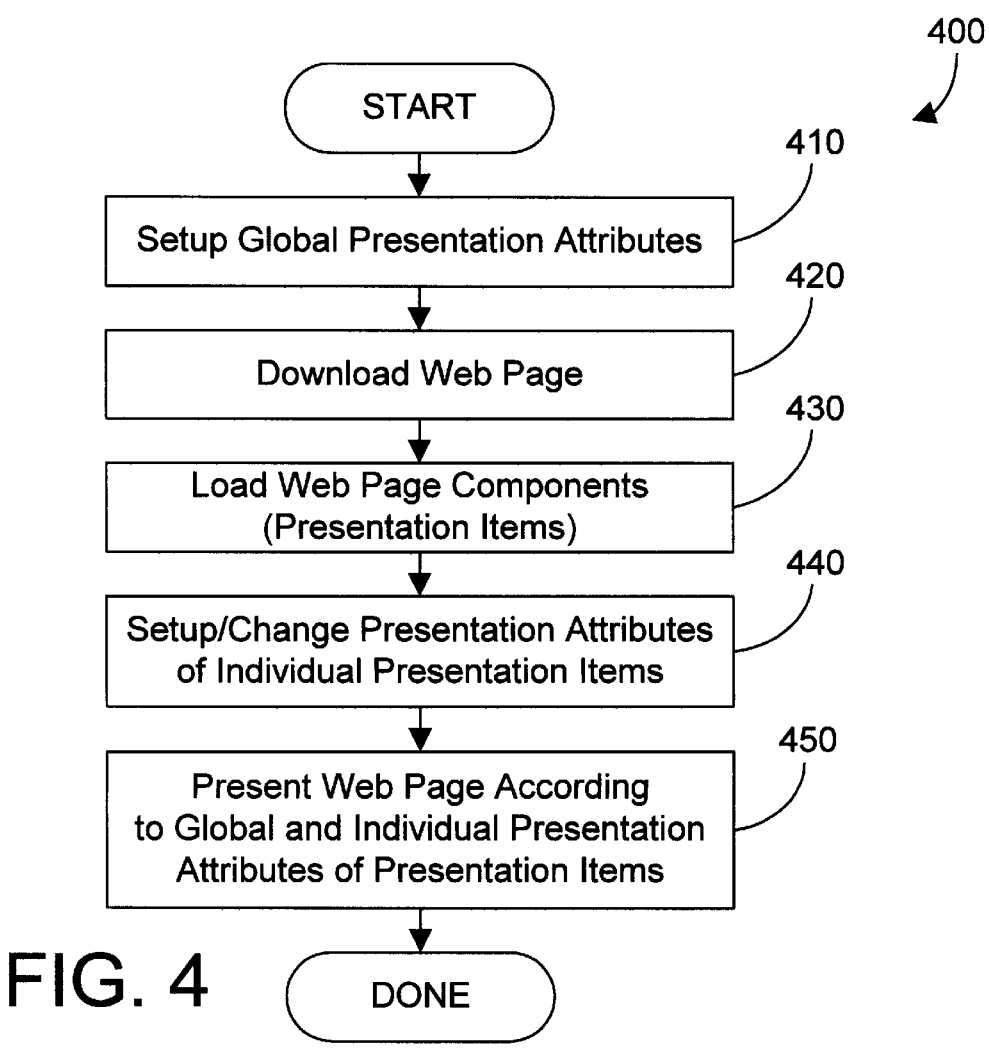
FIG. 4 is a flow diagram of a method for presenting web pages in accordance with the preferred embodiments.
Figure 5:
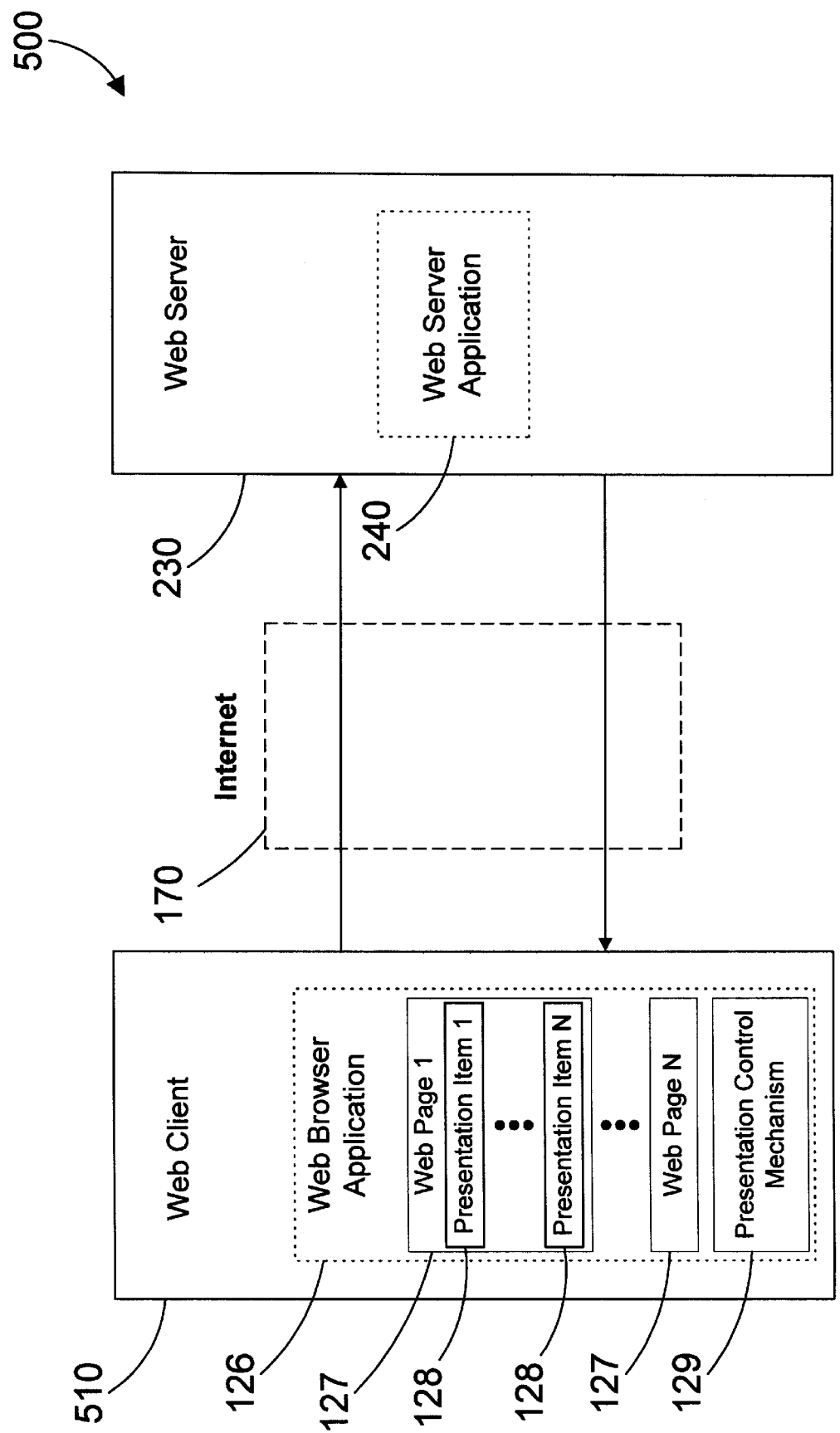
FIG. 5 is a block diagram of a computer system that allows a user to determine how web pages are presented in accordance with a preferred embodiment.

Referring to FIG. 5, a web client 510 in accordance with the preferred embodiments includes a web browser application 126 that includes multiple web pages 127, with each web page containing multiple presentation items 128, and a presentation control mechanism 129. This web client 510 gives the user more control over the presentation of a web page. Referring to FIG. 4, a method 400 for presenting a web page to a user starts off by allowing the user to setup global presentation attributes (step 410). These global attributes, in the preferred embodiment, are default settings for web browser application 126. When the user requests a web page, the page is downloaded (step 420). The web page components, also referred to as presentation items herein, are then loaded (step 430). Once the presentation items are loaded, the attributes of each presentation item may be individually setup or changed. In the preferred embodiment, the global default attributes are used for each presentation item until changed by the user. Finally, the web page is presented to the user according to the global and individual presentation attributes of the presentation items (step 450). In this manner the user has some control of how the web page is presented by appropriately setting up the global presentation attributes and individual presentation attributes of each presentation item.

Figure 6:
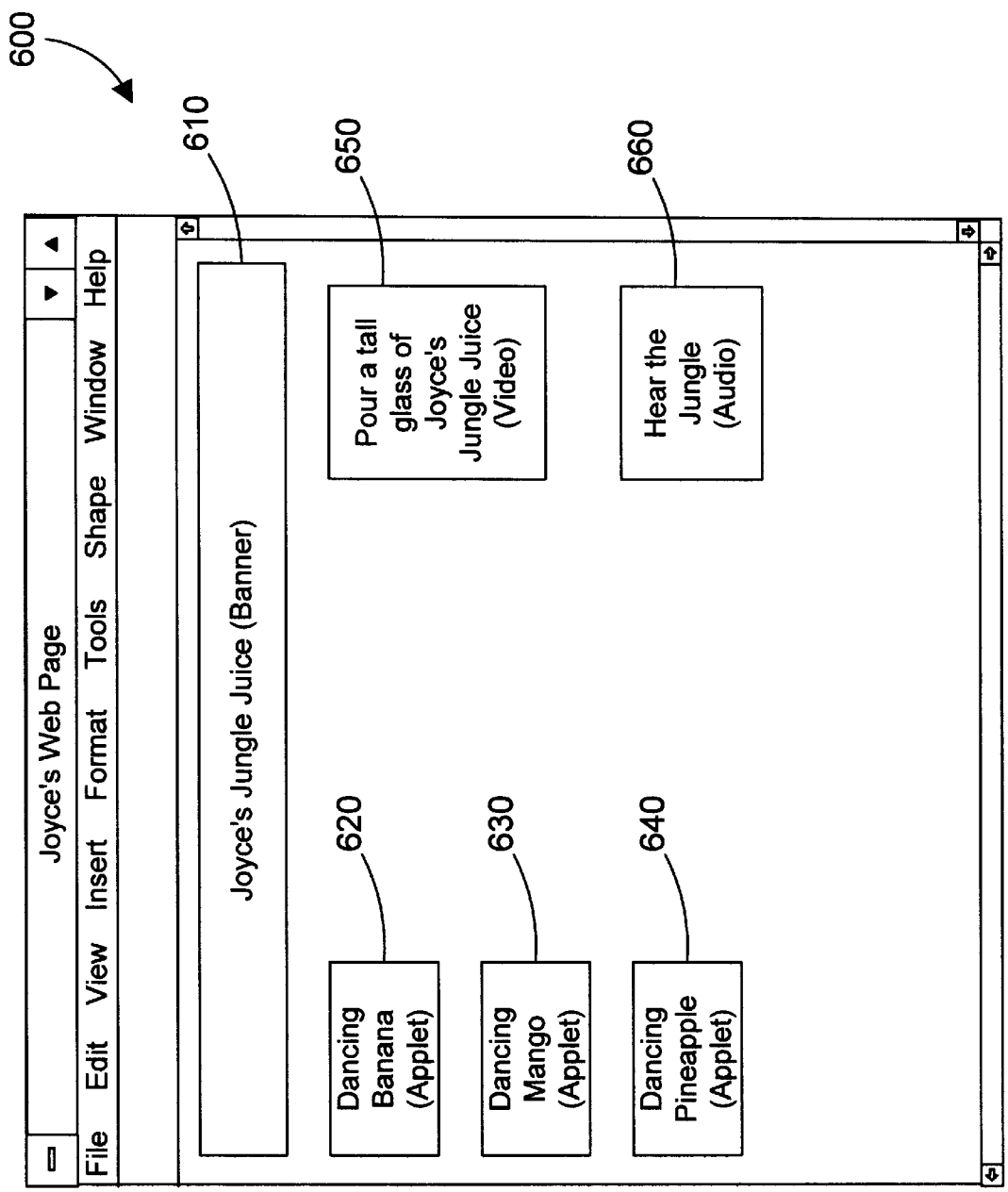
FIG. 6 is a schematic diagram showing presentation items on a sample web page.
Figure 7:
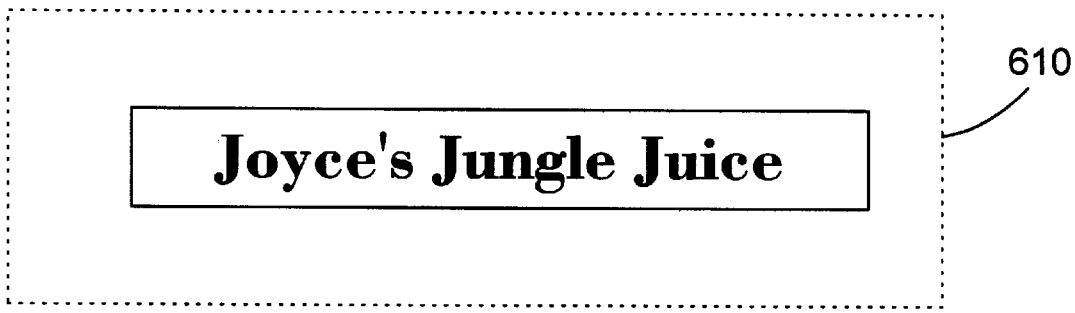
FIG. 7 is an example of a possible banner for the web page of FIG. 6.

A specific example will illustrate the concepts of the present invention. Referring to FIG. 6, we assume that the user has requested a web page called "Joyce's Web Page" which is a home page for a fruit drink known as Joyce's Jungle Juice. A banner 610 displays information relating to Joyce's Jungle Juice. The primary ingredients of Joyce's Jungle Juice are banana, mango, and pineapple. These three ingredients each have corresponding components on the web page: a dancing banana applet 620, a dancing mango applet 630, and a dancing pineapple applet 640. A video component 650 shows a glass of Joyce's Jungle Juice being poured from a pitcher. An audio component 660 provides jungle sounds to the user. These components 610, 620, 630, 640, 650 and 660 all collectively make up the "presentation" of the web page, and are "presentation items" as discussed herein.

If Joyce's Web Page were viewed with a prior art web browser, such as Microsoft Internet Explorer version 3.0, the user would only have the option of turning off all the components of a particular type or having all the components of that type presented. Prior art browsers thus provide the user no control over how the components are presented. Furthermore, prior art browsers only support turning on or off certain categories of components, such as image, audio and video components. Thus, turning off images results in no images being displayed, while turning on images results in all images being displayed. Prior art browsers cannot present two components of the same type differently.

One of the features of the present invention is to give the user control over how presentation items on a web page are presented. However, in practical terms, the level of control will be constrained to assure the user won't completely disable certain items, such as promotional items or advertisements. Many web sites have web pages that include paid advertisements. Obviously, an advertiser does not want to give the user the ability to completely turn off its advertisement, or the advertisement will not receive the desired exposure. However, at the same time, the advertiser does not want an advertisement to become annoying to the user. Therefore, the advertiser can provide predetermined limits for each presentation item that gives the user some control over the presentation of the item within those limits. In this manner a user may customize to some degree how a presentation items is displayed while the advertiser is still able to assure a minimum level of exposure for the advertisement.

Figure 8:
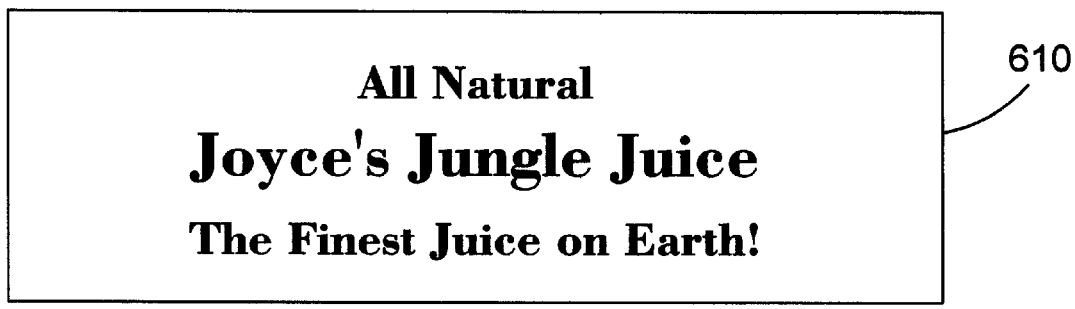
FIG. 8 is another example of a possible banner for the web page of FIG. 6.

FIGS. 7–10 display several options for the Joyce's Jungle Juice banner 610 of FIG. 6. The banner can attract attention by providing different types of motion. One type of motion is illustrated in the two displays of FIGS. 7 and 8. Banner 610 starts off as a small display of the text "Joyce's Jungle Juice". After a predetermined period of time, the invisible border shown by the dotted line in FIG. 7 becomes visible, along with additional text, as shown in FIG. 8. After another predetermined period of time, banner 610 reverts to the smaller version in FIG. 7. In this manner, the banner not only "flashes", attracting the attention of the user, but it also changes its apparent size.

Figure 9:
FIG. 9 is an example of a scrolling marquis for the banner for the web page of FIG. 6.

Another option for displaying banner 610 is to provide a scrolling marquis. This type of marquis is shown in FIG. 9. The words Joyce's Jungle Juice scroll from right to left. However, any other type of motion is possible with this type of banner, such as flashing letters, scrolling the letters into the display from any direction or combination of directions, etc.

Figure 10:
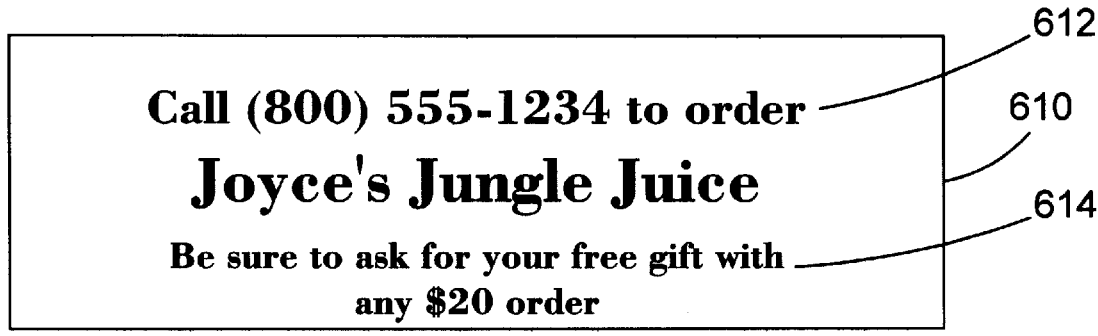
FIG. 10 is an example of yet another banner for the web page of FIG. 6 that displays details of the banner.

Yet another option for displaying banner 610 is shown in FIG. 10. In this example, we assume that the basic banner is as shown in FIG. 8. However, there also exists additional "detail" for the banner, as shown by the information 612 and 614 displayed in the border of banner 610. By setting up the presentation attributes for banner 610, the user can determine whether or not the detail portions 612 and 614 are displayed.

The user can setup or change the presentation attributes of each individual presentation item, or instead can specify a global default for the browser that is applied to all presentation items until changed by the user. A suitable menu for changing the presentation preferences (or attributes) is shown in FIG. 11. Note that a user may invoke this menu to set the global presentation attributes for the browser. In the alternative, the user may invoke this menu to set the presentation attributes for a particular presentation item. One suitable way for a user to invoke this menu is to place the mouse or other pointing device over the presentation item, and click the right button. A menu item "Change Presentation Attributes" would be presented, which would invoke the menu of FIG. 11 when selected. The user can then setup or change the presentation attributes for that presentation item. Note that a combination of presentation attributes is referred to herein as a "presentation mode." A presentation mode includes any suitable combination of presentation attributes, including active time, visible time, and sleep time (described below), as well as size change, motion, or displaying detail as described above with respect to FIGS. 7–10.

The specific menu in FIG. 11 allows the user to check boxes that allow size change, allow motion, and show detail. In addition, the user can enter times for the active time, visible time, and sleep time. Active time is the time that the presentation item is visible and moving. Visible time is the time that the presentation item is visible to the user in any form. Sleep time is the time that the presentation item is not visible to the user. An advertiser or system administrator may place certain limits on the active time, visible time, sleep time, and the relationship between these values. For example, an advertiser may determine that visible time must be greater than or equal to the sleep time, assuring that the presentation item is presented for as long as it is not presented (or asleep). Furthermore, an advertiser may determine that if motion is enabled, the active time has a predetermined relationship to the visible time as determined by a visible constant, which means the presentation item is active for some of the visible time and inactive for the remaining visible time. In this manner predetermined limits may be imposed on the values and relationships between active, visible, and sleep times.

For the example discussed above, if the user enters the active time, the visible time and sleep time are automatically set to twice the active time. If the user enters the visible time, the active time is set to half the visible time, and the sleep time is set to the same value as the visible time. If the user enters the sleep time, the active time is set to half of the sleep time, and the visible time is set to the same value as the sleep time. These statements all assume that the user enters values that are within the permissible range of values that are predetermined and set for each presentation item. The rationale for forcing the sleep time to equal the visible time is to assure that the presentation item is turned on for as long as it is turned off. In other words, if the user decides he doesn't want to see a presentation item for 30 minutes, the visible time will also be set to 30 minutes to balance out the visible time and the sleep time. If motion is enabled, the item will be active (i.e., in motion) for half of the visible time, or 15 minutes.

Another aspect of the present invention is the ability for a user to provide feedback regarding individual presentation items. Referring to FIG. 12, one suitable menu is shown that a user can use to provide feedback relating to a specific presentation item. A user can invoke this menu by right-clicking on the presentation item, and selecting a menu item "Provide Feedback". The menu of FIG. 12 would then be presented to the user. For the specific answers in FIG. 12, we assume that a male user that is 26 years old has right-clicked the dancing banana applet, selected the "Provide Feedback" menu item, and has entered the information shown in FIG. 12. When finished, the user can click on the "Submit" button to provide the feedback, or may click on the "Cancel" button to get rid of the feedback window.

Figure 13:
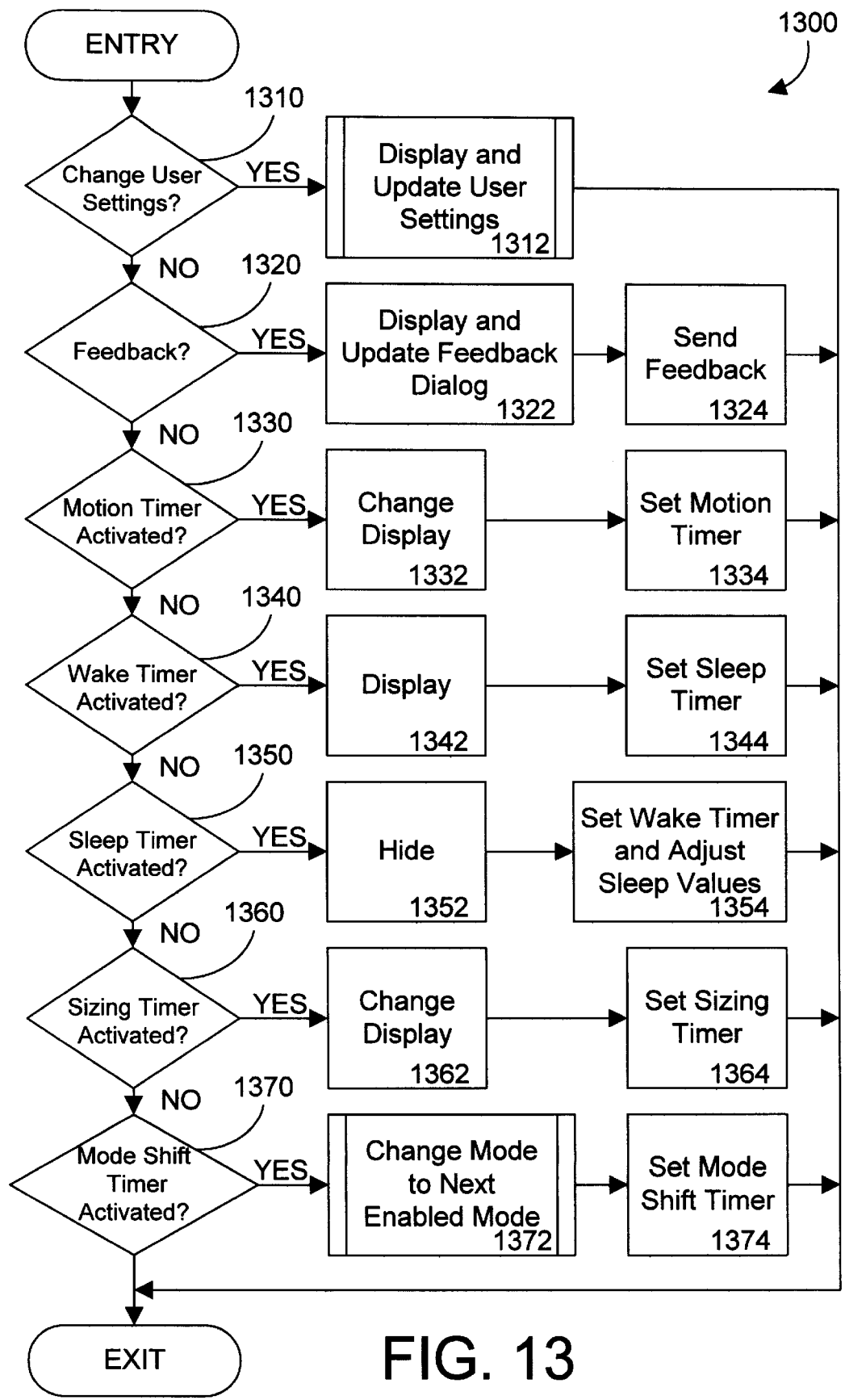
FIG. 13 is a flow diagram showing the steps in a method for controlling the presentation of a web page in accordance with the preferred embodiments.

In accordance with the preferred embodiment, presentation control mechanism 129 of FIGS. 1 and 5 performs a method 1300 of FIG. 13. For the specific example in FIG. 13, method 1300 assumes that a presentation item that is a display item (such as an image) is the presentation item of interest. However, one skilled in the art will realize that certain steps in method 1300 may be slightly altered to apply to audio, video, or other types of presentation items. For example, the display step 1342 would correspond to playing an audio file if the presentation item is an audio item.

Method 1300 begins by determining whether the user wants to change settings for a particular presentation item (step 1310). If so, the answer to step 1310 is YES, and the user settings are displayed to the user and updated as directed by the user (step 1312). If the user has not requested to change user settings (step 1310=NO), method 1300 then determines whether the user has requested to send feedback regarding a particular presentation item (step 1320). If so, the answer to step 1320 is YES, and the feedback window is displayed to the user (step 1322). Once the user has completed the feedback information and clicks the "submit" button, the feedback the user entered into the feedback window is sent to an appropriate entity for collecting feedback information (step 1324), such as web server 230. If the user has not selected to provide feedback (step 1320=NO), method 1300 checks to see if the motion timer has been activated (step 1330). Activation of the motion timer signals that a change in the display is required to give the appearance of motion. Thus, if the motion timer has been activated (step 1330=YES), the display is changed (step 1332), and the motion timer is set (step 1334).

If the motion timer has not been activated (step 1330=NO), method 1300 checks to see if the wake timer has been activated (step 1340). If so, the answer to step 1340 is YES, and the presentation item is displayed (step 1342). The sleep time is then set (step 1344) so that the presentation item can be put back in its sleep state when the timer is activated. If motion is allowed, the motion time is also set so motion will occur. If the wake timer was not activated (step 1340=NO), method 1300 determines whether the sleep timer has been activated (step 1350). If so, the answer to step 1350 is YES, and the presentation item is hid (step 1352). Then, in step 1354, the wake timer is set so that the presentation item can be woken up from its sleep when the wake timer is activated, and the sleep time and maximum sleep time are adjusted. This is done by observing if the sleep time has reached the maximum sleep time. If not, the sleep time is adjusted by a sliding sleep scale factor, which is an increment for increasing the sleep time. This can be thought of as a "reward" for the user—if the user has viewed the presentation item for a long period of time, the sleep time can be adjusted up to allow longer periods of non-presentation. In similar fashion, the maximum sleep time may also be increased by a sliding maximum sleep factor, which is an increment for increasing the maximum sleep time, if the maximum sleep time is less than a specified absolute maximum sleep time.

If the sleep timer was not activated (step 1350=NO), method 1300 next checks to see if the sizing timer was activated (step 1360). If so, the answer to step 1360 is YES, and the display is changed (step 1362) to its next size state. The sizing timer is then set (step 1364) so that the display will go to its previous size when sizing timer is activated. If the sizing timer was not activated (step 1360=NO), method 1300 determines whether the mode shift timer was activated (step 1370). If so (step 1370=YES), the mode of the presentation item is changed to its next mode (step 1372), and the mode shift timer is set (step 1374). The mode shift timer is set to change the presentation item from one presentation mode to the next. For example, the banner 610 in FIG. 6 could be set to cycle between the various different modes of displaying the banner shown in FIGS. 7–10. Method 1300 is invoked anytime any one of the decision blocks 1310, 1320, 1330, 1340, 1350, 1360, and 1370 have a YES answer. Method 1300 is a form of state machine that determines what actions need to be performed when certain events occur.

Figure 14:
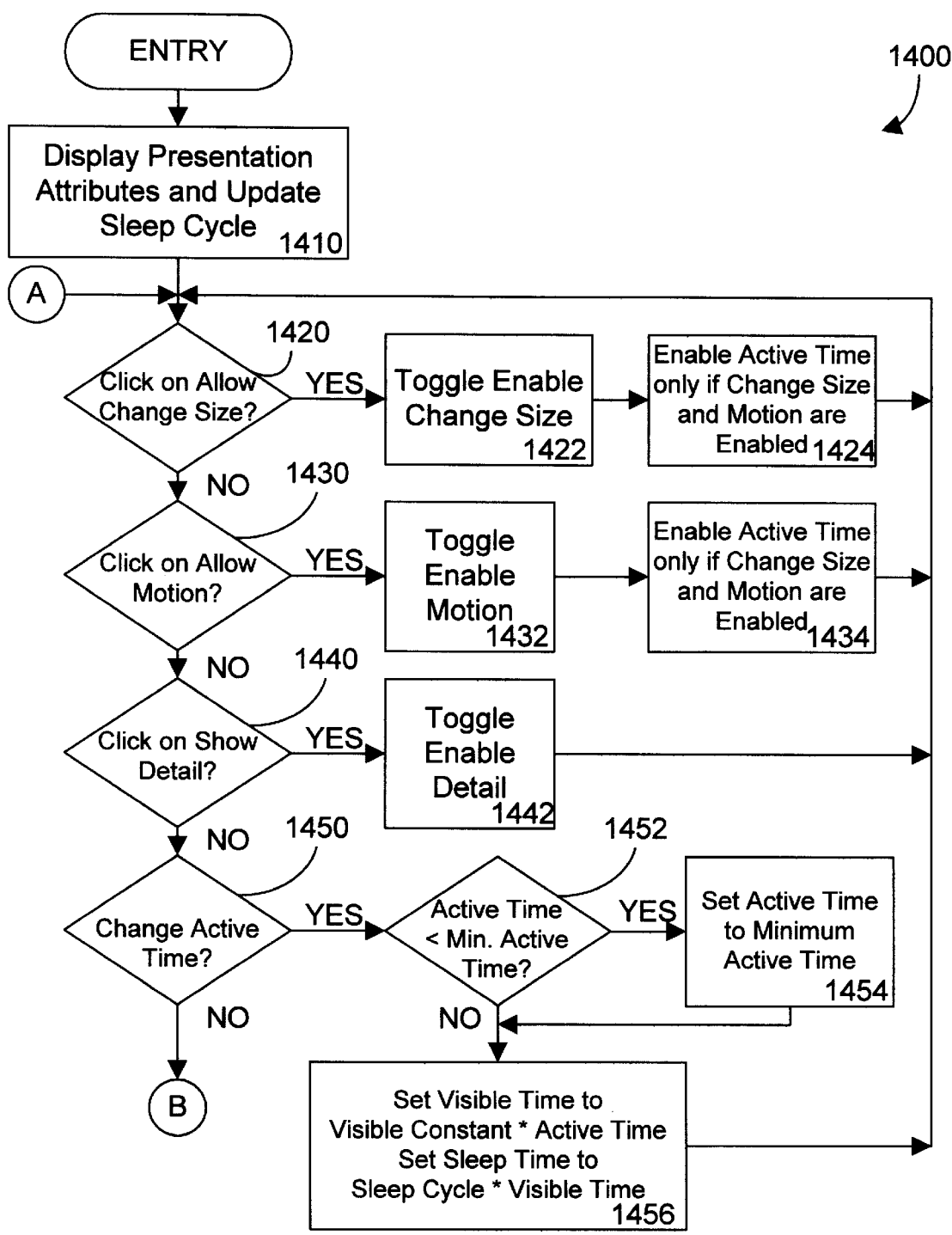
FIGS. 14 and 15 are each portions of a flow diagram for a method of allowing a user to change how a web page is displayed.
Figure 15:
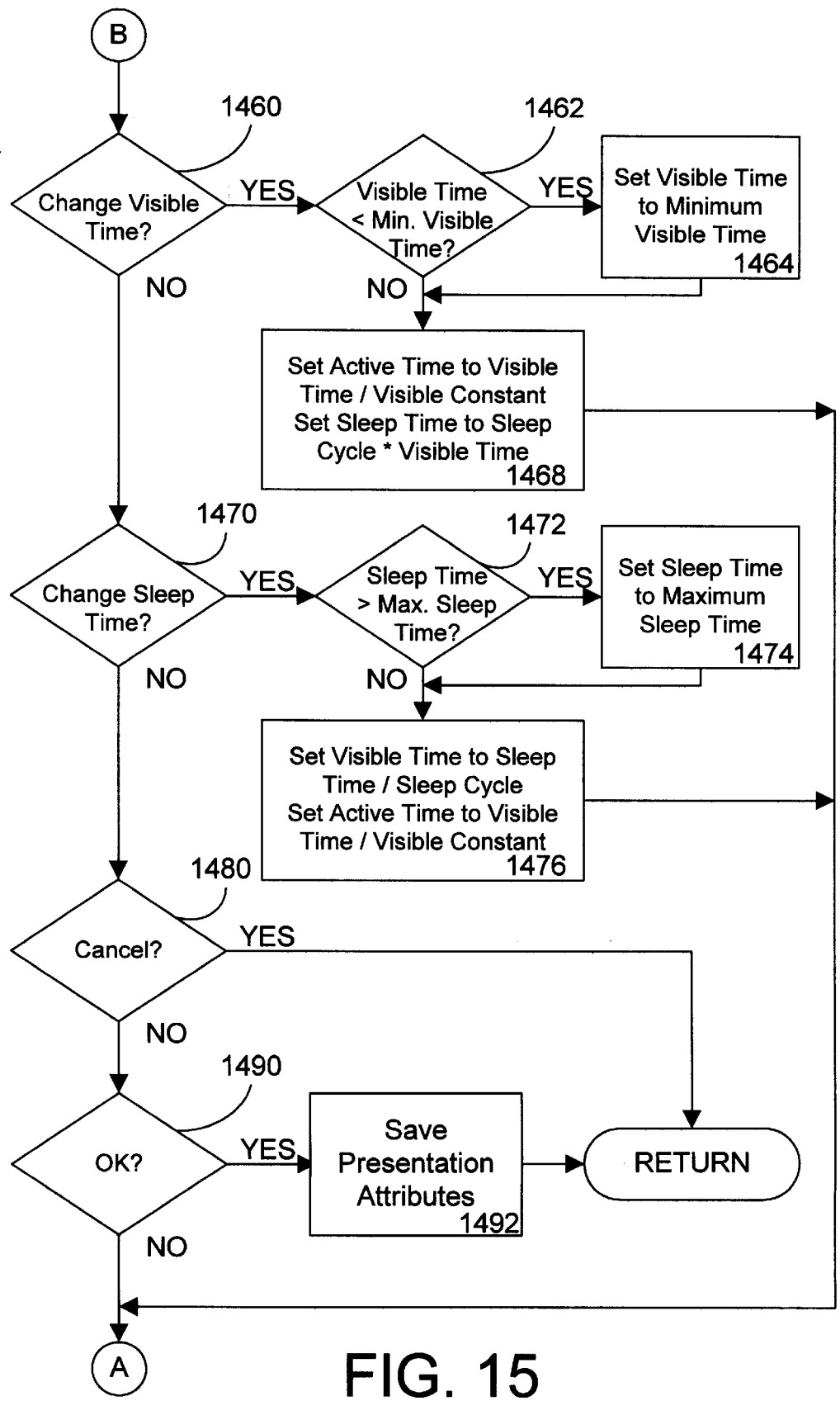

Presentation control mechanism 129 of FIGS. 1 and 5 allows a user to setup and change both global presentation attributes that are set as a default for the browser, as well as individual presentation attributes for each presentation item on a web page. Referring now to FIGS. 14 and 15, a specific method 1400 for implementing step 1312 of FIG. 13 is presented that allows a user to update the user settings. Note that method 1400 applies to a user changing either global presentation attributes for the browser, or individual presentation attributes for a particular presentation item.

Method 1400 begins by displaying the current presentation attributes to the user (step 1410), and by updating the sleep cycle, setting it to current sleep time divided by current visible time. One example of a display of presentation attributes is shown in FIG. 11. If the user clicks on the "allow change size" attribute (e.g., by checking or unchecking the first box in FIG. 11), the answer to step 1420 is YES, and the enable change size attribute is toggled to its opposite state (step 1422). Note that to change size, a presentation item must have both its change size attribute and its motion attribute enabled, at which point the active time box becomes available for the user to enter a time (step 1424).

If the user clicks on the allow motion attribute, the answer to step 1430 is YES, and the enable motion attribute is toggled to its opposite state (step 1432). Like in step 1424, step 1434 only allows the user to enter an active time if the change size attribute and the motion attribute are both enabled. If the user clicks on the show detail attribute, the answer to step 1440 is YES, and the enable detail attribute is toggled to its opposite state (step 1422). If the user enters an active time in the active time box, method 1400 first determines whether the active time is less than the minimum allowed active time (step 1452). If so (step 1452=YES), the active time is set to the minimum allowable active time (step 1454). The visible time is then set to equal the visible constant multiplied by the active time (step 1456). The visible constant is the percent of time that the presentation item is in motion compared to the time it is not in motion. The sleep time is also set equal to the sleep cycle multiplied by the visible time (step 1456).

Referring now to FIG. 15, if the user enters a visible time in the visible time box, the answer to step 1460 is YES. Method 1400 then determines whether the visible time is less than the minimum visible time (step 1462). If so (step 1462=YES), the visible time is set equal to the minimum visible time (step 1464). The active time is then set to equal the visible time divided by the visible constant, and the sleep time is set to equal to the sleep cycle multiplied by the visible time (step 1468).

If the user enters a sleep time in the sleep time box, the answer to step 1470 is YES, and step 1472 determines whether the sleep time is greater than the maximum sleep time. If so (step 1472=YES), the sleep time is set to equal the maximum sleep time (step 1474). The visible time is then set to equal the sleep time divided by the sleep cycle, and the active time is set to equal the visible time divided by the visible constant (step 1476). Note that the user may cancel (step 1480=YES), which causes method 1400 to return. In the alternative, the user may click OK (step 1490), which causes method 1400 to save the presentation attributes (step 1492) before returning. Method 1400 continues until the user clicks on the cancel button or the OK button.

Referring to FIG. 16, each presentation item 128 in accordance with the preferred embodiments has a set of corresponding presentation attributes. For example, the size change enabled attribute 1610 is set or reset by the user clicking the size change attribute box in FIG. 11. The set of attributes in FIG. 16 corresponds to the attributes discussed with regard to the various steps of method 1400 in FIGS. 14 and 15. The following attributes all correspond to a user's setup of a presentation item in FIG. 11: size change enabled 1610; motion enabled 1614; active time 1618; visible time 1622; sleep time 1626; and enable detail 1632. Note that the active time 1618, visible time 1622, and sleep time 1626 are set according to predetermined limits that are set either globally or for each presentation item, so they may be actually overriden by these limits rather than reflecting the values the user enters. The remaining attributes in FIG. 16 are attributes that are not set by the user, but are set according to other constraints. These include: last size change 1612; motion speed 1616; minimum active time 1620; minimum visible time 1624; minimum sleep time 1628; maximum sleep time 1630; mode shift time 1634; current mode 1636; visible constant 1638; sleep cycle 1640; absolute maximum sleep time 1642; sliding sleep scale factor 1644; and sliding maximum sleep factor 1646. In the preferred embodiments herein, these attributes are setup by the provider of the presentation item.

Note that the specific attributes listed above and shown in FIG. 16 are according to the preferred embodiments, and using more or fewer presentation attributes is within the scope of the present invention. One skilled in the art will recognize that there are many possible variations and different presentation attributes that could be specified. The present invention extends to any means for providing the user control over the presentation of individual presentation items on a web page, including text, images, audio, video, and any other item that can be presented with a web page. By providing some measure of control to the user, the user can customize a web page to his or her own individual taste, within the limits set by the provider of the web page or presentation item. This control may actually enhance the effect of certain promotional items by allowing a user to alter the presentation of the item so that the items is presented in the most pleasing manner.

While the invention has been particularly shown and described with reference to preferred exemplary embodiments thereof, it will be understood by those skilled in the art that various changes in form and details may be made therein without departing from the spirit and scope of the invention. For example, while the preferred embodiments herein are discussed in terms of HTML pages, other page formats and data formats are equally encompassed by the present invention. The term page as used herein is intended to encompass any quantum of data that may be processed or displayed. In addition, while the invention is shown for exemplary purposes with regard to web clients and web servers that communicate over the Internet, the present invention applies to any type of client/server scenario on any suitable network. Also, the description herein refers to a "user" that may perform certain functions. The term "user" as used in the specification and claims herein expressly includes any agent that may perform the functions of a user, including without limitation human users, computer functions, and software programs in any form. In addition, while specific examples shown in FIGS. 11–16 related to the display of an image such as banner 610 of FIG. 6, the present invention extends to similarly setting up and changing presentation attributes for other types of presentation items as well, such as audio, video, or any other presentation item that may be presented with a web page.

We claim:

1. An apparatus comprising:
   at least one processor;
   a memory coupled to the at least one processor;
   at least one web page residing in the memory, the at least one web page including at least one presentation item, the at least one presentation item having a corresponding plurality of user-defined presentation attributes;
   a web browser residing in the memory and executed by the at least one processor the web browser including a presentation control mechanism that allows a user to define the plurality of presentation attributes for displaying the at least one presentation item to the user, while the web browser displays the web page and that displays the at least one presentation item according to the plurality of presentation attributes when the at least one web page is displayed by the web browser.

2. The apparatus of claim 1 wherein the plurality of presentation attributes include:
   active time for the at least one presentation item;
   visible time for the at least one presentation item; and
   sleep time for the at least one presentation item.

3. The apparatus of claim 1 wherein the plurality of presentation attributes include:
   motion for the at least one presentation item; and
   size change for the at least one presentation item.

4. The apparatus of claim 1 wherein the plurality of presentation attributes include the display of detail for the at least one presentation item.

5. The apparatus of claim 1 further comprising a feedback mechanism associated with the at least one presentation item to communicate feedback from the user regarding the presentation item.

6. The apparatus of claim 1 wherein the plurality of presentation attributes is userdefined within predetermined limits set for the corresponding presentation item.

7. The apparatus of claim 1 wherein the presentation control mechanism shifts the at least one presentation item through a sequence of presentation modes.

8. A program product comprising:
   (A) a web browser, the web browser including a presentation control mechanism that allows a user to define a plurality of presentation attributes for displaying at least one presentation item on at least one web page to a user, while the web browser displays the web page and that displays the at least one presentation item according to the plurality of presentation attributes when the at least one web page is displayed by the web browser; and
   (B) signal bearing media bearing the web browser.

9. The program product of claim 8 wherein the signal bearing media comprises recordable media.

10. The program product of claim 8 wherein the signal bearing media comprises transmission media.

11. The program product of claim 8 wherein the plurality of presentation attributes include:
    active time for the at least one presentation item;
    visible time for the at least one presentation item; and
    sleep time for the at least one presentation item.

12. The program product of claim 8 wherein the plurality of presentation attributes include:
    motion for the at least one presentation item; and
    size change for the at least one presentation item.

13. The program product of claim 8 wherein the plurality of presentation attributes include the display of detail for the at least one presentation item.

14. The program product of claim 8 further comprising a feedback mechanism associated with the at least one presentation item to communicate feedback from the user regarding the presentation item.

15. The program product of claim 8 wherein the plurality of presentation attributes is user-defined within predetermined limits set for the corresponding presentation item.

16. The program product of claim 8 wherein the presentation control mechanism shifts the at least one presentation item through a sequence of presentation modes.

17. A method for determining the presentation of a web page to a user, the method comprising the steps of:
    specifying in a web browser a plurality of presentation attributes for at least one presentation item on the web page; while the web browser displays the web page and
    the web browser displaying the presentation item on the web page in accordance with the specified presentation attributes when the web page is displayed by the web browser.

18. The method of claim 17 further comprising the step of:
    specifying a plurality of global presentation attributes that are applied to each presentation item on the web page as a default unless the user overrides the default by specifying the plurality of presentation attributes for a selected presentation item.

19. The method of claim 17 wherein the plurality of presentation attributes include:
    active time for the at least one presentation item;
    visible time for the at least one presentation item; and
    sleep time for the at least one presentation item.

20. The method of claim 17 wherein the plurality of presentation attributes include:

motion for the at least one presentation item; and size change for the at least one presentation item.

21. The method of claim 17 wherein the plurality of presentation attributes include the display of detail for the at least one presentation item.

22. The method of claim 17 further comprising the step of providing a feedback mechanism associated with the at least one presentation item to communicate feedback from the user regarding the presentation item.

23. The method of claim 17 further comprising the step of shifting the at least one presentation item through a sequence of presentation modes.

* * * * *